Dec. 4, 1951 R. M. WILMOTTE ET AL 2,577,668

CIRCUIT STABILIZER

Filed May 15, 1944 4 Sheets-Sheet 1

Inventor

Raymond M. Wilmotte

C. X. Castle

Dec. 4, 1951 R. M. WILMOTTE ET AL 2,577,668

CIRCUIT STABILIZER

Filed May 15, 1944 4 Sheets-Sheet 2

Inventor

Raymond M. Wilmotte

C. X. Castle

Inventor
Raymond M. Wilmotte
C. X. Castle

Inventor
Raymond M. Wilmotte
C. K. Castle

Patented Dec. 4, 1951 2,577,668

UNITED STATES PATENT OFFICE 2,577,668

CIRCUIT STABILIZER

Raymond M. Wilmotte, Washington, D. C., and Clemens X. Castle, Silver Spring, Md., assignors, by direct and mesne assignments, to Padevco, Inc., Washington, D. C., a corporation of Delaware Application May 15, 1944, Serial No. 535,767

16 Claims. (Cl. 343—101)

This invention relates to means for automatically maintaining predetermined phase and amplitude relations among a plurality of currents. It is necessary in many systems to maintain the impedance of component circuits constant. In antenna arrays, for example, it is essential that there be no departures of the phases or amplitudes of the several antenna currents, since such departures would cause deformations of the radiation pattern of the array. Difficulty in maintaining a desired radiation pattern has been experienced in the past because of variations of the impedance of the antennas and circuits caused by weather changes and other factors.

It is an object of this invention to provide a system for automatically controlling the phase or amplitude, or both, of the current in a network. It is another object of this invention to maintain the impedance of a network constant. It is a further object of this invention to provide a system of the kind herein referred to which shall be substantially independent of tube ageing and other variations in the control circuits. It is a further object of this invention to provide a stabilized antenna which will automatically maintain a predetermined radiation pattern. It is another object of the invention to provide a self-stabilizing electron tube commutator. It is another object of this invention to provide means for monitoring the phases and amplitudes of the currents in an antenna array or other system of networks. It is a still further object of this invention to provide a phase comparison system for operating a differential relay which shall be independent of incidental amplitude variations occurring in the system.

Figure 1:
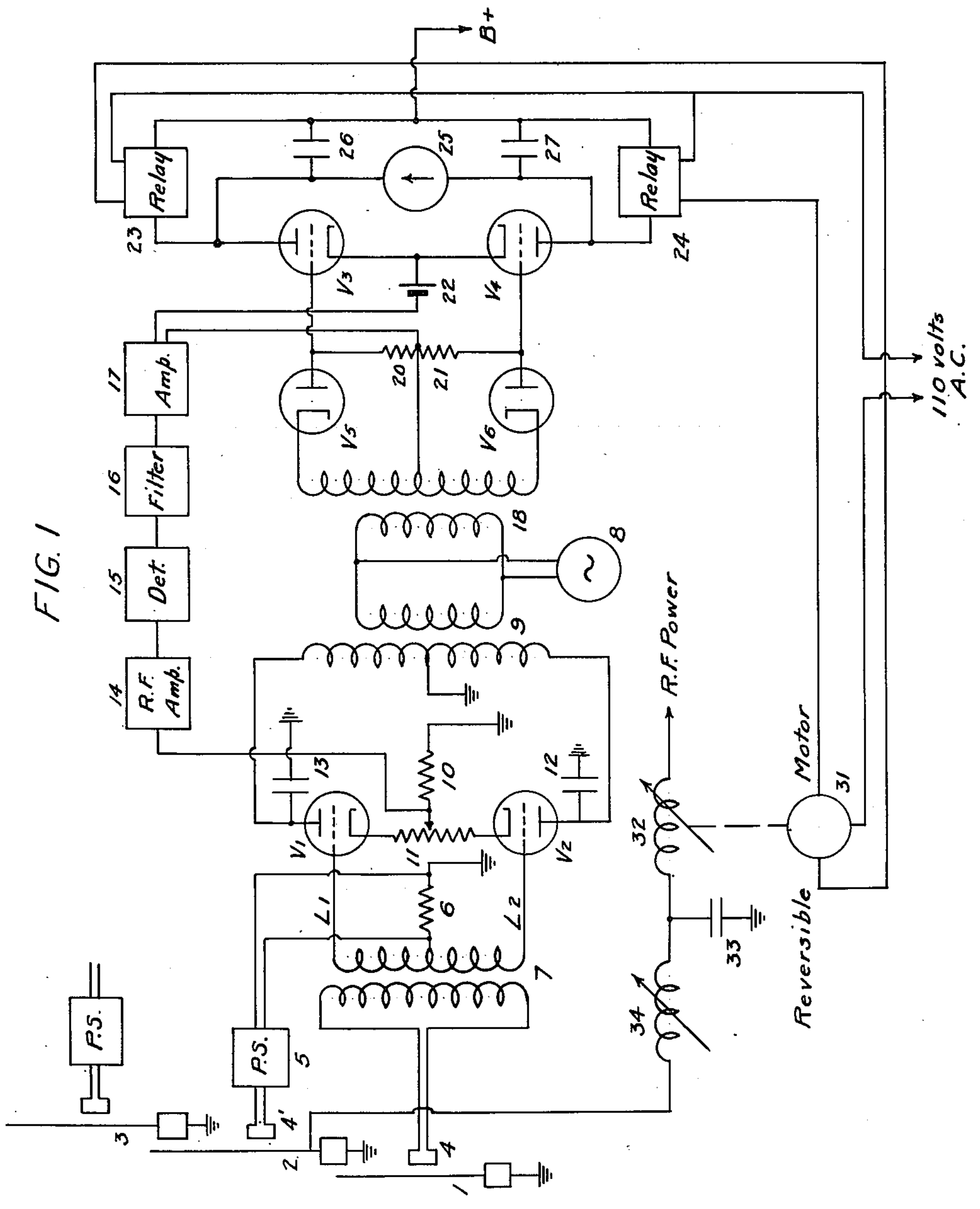
Figure 1A:
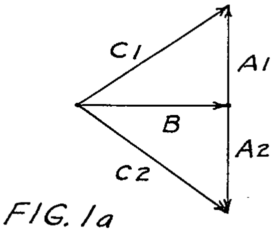
Figure 1B:
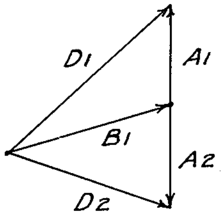
Figures 1C, 1D, 1E:
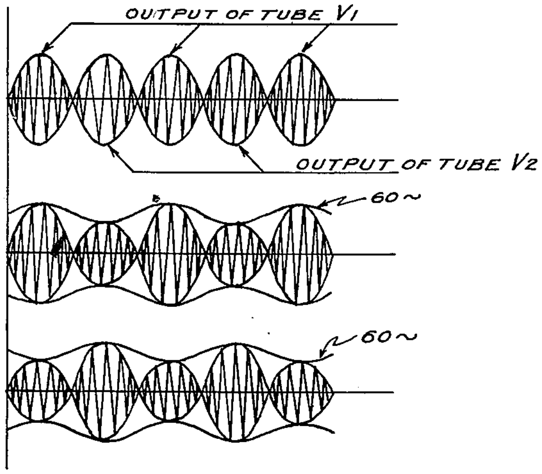
Figure 2A:
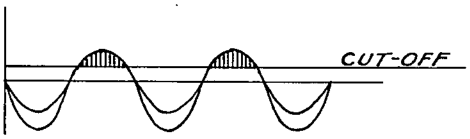
Figure 2B:
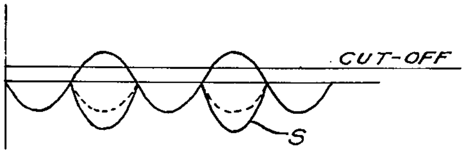
Figure 2:
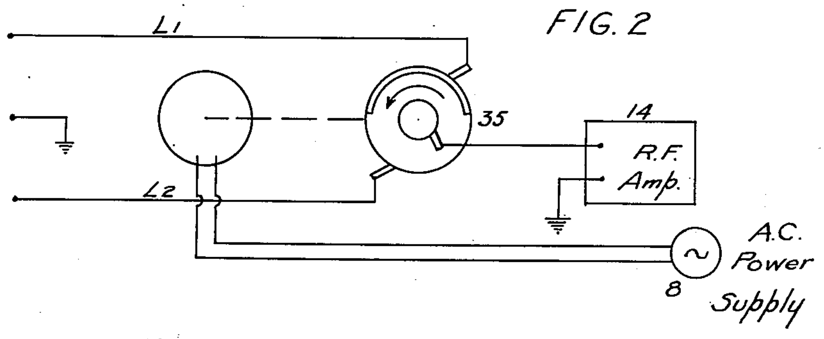
Figure 2C:
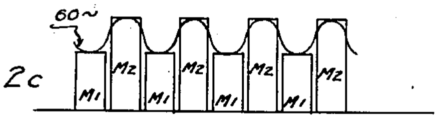
Figure 3:
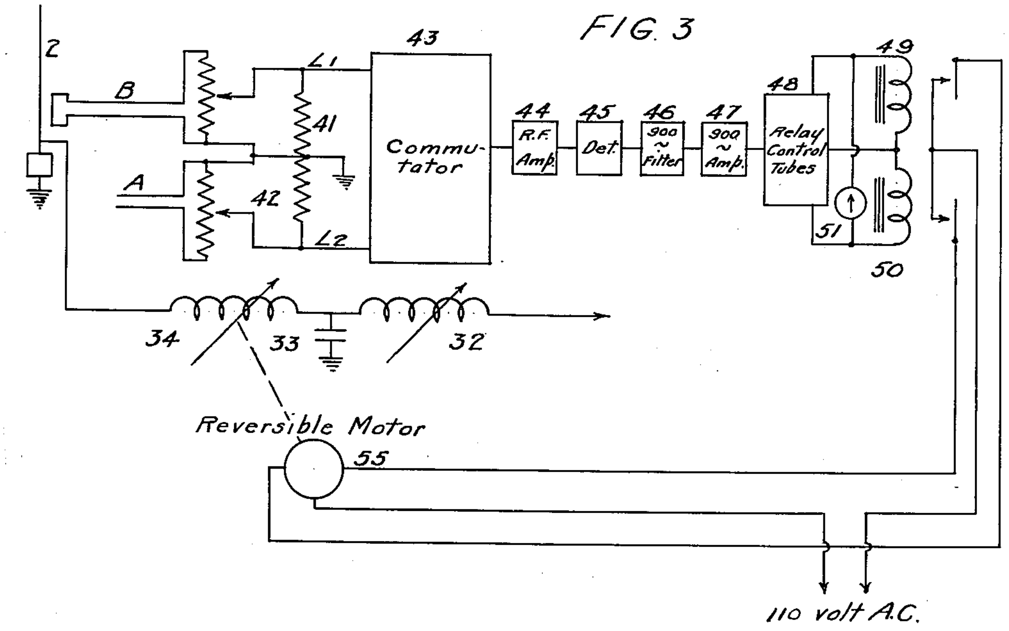
Figures 4, 6, 7:
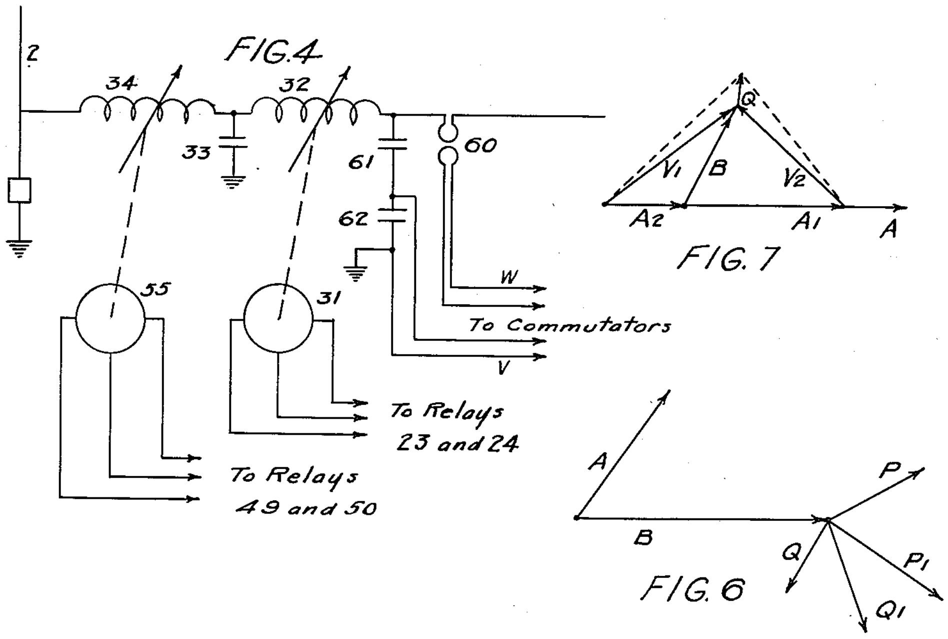
Figure 5:
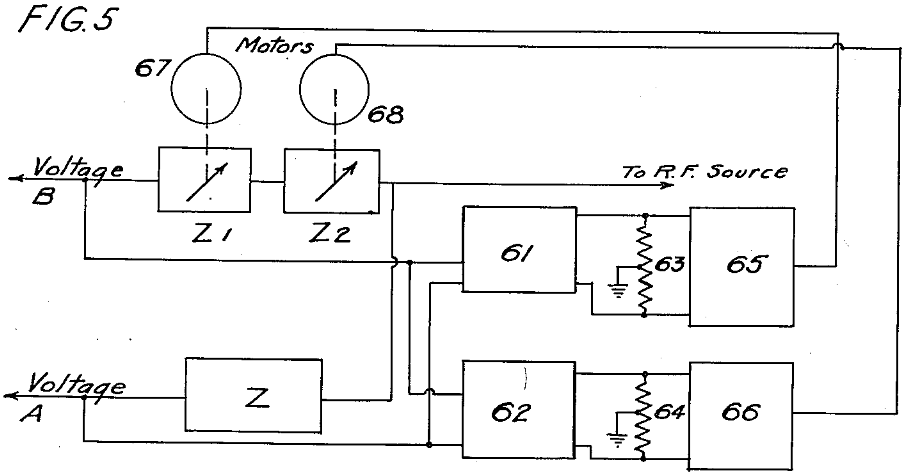

The invention will be more fully understood from the following detailed description and accompanying drawings, in which:

Figure 1 shows the phase responsive portion of the system applied to an antenna array, Figures 1*a* through 1*e*, inclusive, are diagrams indicating the operation of the commutator circuit, Figure 2 shows a mechanical commutator, Figures 2*a* and 2*b* are diagrams illustrating the operation of another part of the system, Figure 2*c* is a diagram pertaining to the operation of the mechanical commutator, Figure 3 shows the amplitude responsive portion of the system, Figure 4 shows a modification of the system shown in Figures 1 and 3, Figure 5 schematically shows another modification of the invention, and, Figures 6 and 7 are vector diagrams of the operation of the system shown in Figure 5.

Reference is now made to Figure 1 showing the portion of the system for maintaining predetermined phase relationships among a plurality of alternating currents or voltages of the same frequency. The currents whose phases are monitored may be those in a broadcast antenna system. In practice the antenna array may include two or more radiators. Three such radiators are shown in Figure 1 and are designated by the reference numerals 1, 2, and 3. The voltages derived from radiators 1 and 2 by coupling loops 4 and 4', or any other means, are impressed on input circuits of electron tubes V1 and V2. Similar voltages derived from other pairs of radiators of the antenna array may be impressed on similar electron tube circuits not shown. The voltage B, derived from loop 4' is impressed cophasally on the leads L1 and L2. The voltage, A, derived from loop 4 is fed through transformer 7 counterphasally to the leads L1 and L2. The phase shifting circuit 5 is adjusted so that the voltages A and B are impressed on the leads L1 and L2 in phase quadrature.

The plate circuits of tubes V1 and V2 are energized by an A. C. power source, 8, which may be 60 C. P. S. or any other convenient frequency, supplied through transformer 9. A load impedance 10 common to the plate circuits of tubes V1 and V2 is connected between a center tap of the secondary of transformer 9 and a tap on resistor 11. The plates of tubes V1 and V2 are connected to ground through radio frequency bypass condensers 12 and 13. The tap on resistor 11 is set so that no 60 cycle component from the power source, 8, appears across impedance 10 when the voltages from pickup loops 4 and 4' are applied to the input circuit of tubes V1 and V2 in phase quadrature.

The operation of the system of Figure 1 may be best understood by reference to Figures 1*a*, 1*b*, 1*c*, 1*d*, and 1*e*. The vector A1 in Figure 1*a* represents the voltage impressed by transformer 7 on the control grid of tube V1; the vector B represents the voltage across resistor 6 impressed on the control grids of tubes V1 and V2 through the transformer 7; and A2 represents the voltage impressed by transformer 7 on the control grid of tube V2. The resultant voltages on the control grids of tubes V1 and V2 are, therefore, represented by C1 and C2, respectively. As long as the voltages A and B are in phase quadrature the resultants C1 and C2 are equal. The voltage across load impedance 10 would, in this case, be as shown in Figure 1c. It can be seen that this output voltage has no 60 cycle component. However, when the phase of the current in antenna 2 drift with respect to the current in antenna 1, a voltage B1, Figure 1b, would be impressed on the control grids and the resultant voltages on the control grids of tubes V1 and V2 would be as represented by vectors D1 and D2, respectively, as is shown in Figure 1b. The voltage D1 is now larger than D2, the signals applied to the control grids of tubes V1 and V2 are no longer equal and the output of the commutator appearing across the impedance 10 contains a 60 cycle component as indicated in Figure 1d. If the phase of the current in antenna 2 should drift in the opposite direction, the output of the commutator would then be as indicated in Figure 1e. It will be seen from inspection of Figures 1d and 1e, that the commutator output has a 60 cycle component in both cases, but that this component has opposite phases in these two cases.

The leads L1 and L2 are shown in Figure 2, connected to a mechanical commutator 35 for alternately switching leads L1 and L2 to an R. F. amplifier 14. The commutator may be of the synchronous motor type and is energized by an A. C. power source 8. The output of the mechanical commutator 35 is analogous to the output of the electron tube commutator of Figure 1. Corresponding to the sine wave envelope of Figure 1d, for example, the mechanical commutator will have an output whose envelope consists of substantially rectangular pulses such as shown in Figure 2c. The output from lead L1, to amplifier 14, will be the pulses labeled M1, and the output from lead L2 will be the pulses labeled M2. In this figure only the upper halves of the pulses are shown. It can be seen in Figure 2c that the envelope of the pulses M1 and M2 has a 60 cycle component.

The output voltages of the commutator are amplified by an R. F. amplifier 14 and demodulated by detector 15. The 60 cycle component is then isolated by filter 16 amplified in amplifier 17 and impressed co-phasally on the control grid of tubes V3 and V4. A 60 cycle voltage is also impressed by the supply source 8 through a transformer 18 on a pair of diodes V5 and V6. The outputs of the diodes develop alternate negative pulses across the load resistors 20 and 21, which are applied to the control grids of tubes V3 and V4, respectively. A suitable fixed or self bias 22 may be applied to the control grids of tubes V3 and V4. The voltages on the control grids of tubes V3 and V4 are indicated in Figures 2a and 2b, respectively. These figures illustrate the case represented by Figure 1d or Figure 2c. It will be noted that the grid voltage of tube V3 swings above cutoff during each half cycle and that tube V3 will therefore pass plate current, while the grid voltage on tube V4 remains below cutoff as indicated by curve S in Figure 2b and hence tube V4 will draw no plate current. When the situation illustrated in Figure 1e prevails, it is evident tube V4 will then pass plate current but tube V3 will not pass plate current. When the antenna currents have their right predetermined phases and hence appear in phase quadrature on the grids of tubes V1 and V2, only the negative pulses developed by diodes V5 and V6 will be impressed on the grids of V3 and V4 and neither of these tubes will then pass plate current. It is apparent then that relay 23 will operate if the phase of the current in antenna 2, advances with respect to its predetermined position, and relay 24 will be operated if the phase of the current in antenna 2 lags behind its predetermined position.

Relays 23 and 24 are shown connected to any suitable reversible motor 31, in series with an A. C. power source. These relays may be electronic or magnetic types. Closing of relay 23 in response to an output from tube V3 causes the motor to rotate in one direction and the closing of relay 24 in response to an output from tube V4 causes the motor to rotate in the opposite direction. The motor is mechanically coupled to the input series elements 32 of a T network, which element affects chiefly the phase shift through the network, the coupling being such that element 32 will be adjusted to return the phase of the current in antenna 2 to its predetermined position whenever a deviation therefrom occurs. Condenser 26 and 27 are shunted across relays 23 and 24 to prevent chattering of the relays.

By means of networks similar to those shown in Figure 1 the relative phases of the current in each of the other radiators of the array with respect to radiator 1, may be controlled in the same manner as the phase of the current in antenna 2. Thus in a second system similar to that shown in Figure 1, loop 4'' would replace loop 4', and the voltages derived from loops 4 and 4'' would be utilized in the same manner as the voltages from circuits A and B in Figure 1, to control the relative phase of current in radiator 3 with respect to the phase of the current in radiator 1.

In order to measure the phase relations of the antenna currents a zero-centered voltmeter 25 is connected across the plates of tubes V3 and V4. The meter is calibrated so that it reads the magnitude and direction of phase deviations.

The ratios of the amplitude of the current in antenna 1 to the amplitude of the current in each of the other antennas are maintained at their predetermined values by means of the system shown in Figure 3. In this circuit the transformer 7 of Figure 1 is replaced by a center-tapped resistor 41, 42. A circuit designated by V impresses an R. F. voltage across resistor 42, while a circuit designated by W impresses an R. F. voltage on resistor 41. The center tap of resistors 41 and 42 is grounded and the ungrounded ends of the resistors 41 and 42 are connected by the leads L1 and L2 to the commutator 43, similarly to Figures 1 and 2. Aside from the input resistors 41, 42, the commutator 43 may be the same as the one shown in Figure 1 or Figure 2. R. F. amplifier 44, detector 45, filter 46, amplifier 47, and relay control circuit 48 perform essentially the same functions and may be similar to their counterparts in Figure 1, and hence are represented by a block diagram. The relays 49 and 50 correspond to the relays 23 and 24 of Figure 1 and control the reversible motor 55. The motor is mechanically coupled to the adjustable element 34 of the T network in the R. F. feeder for antenna 2. Adjustment of element 34 varies mainly the amplitude of the current in antenna 2. The motor 55 is coupled to element 34 so that the latter is varied to re-establish the predetermined ratio of the current amplitudes whenever a deviation therefrom occurs.

The circuits V and W are adjusted so as to impress voltages of the same magnitudes on resistors 41 and 42 when the antenna currents have their predetermined amplitude ratio. It is evident that under this condition the commutator output will not have a 60 cycle component and the relays 49 and 50 and motor 55 will remain unenergized. If the current in antenna 2 should increase or decrease the commutator output will have a 60 cycle component and relay 49 or 50 would close and motor 55 would operate to adjust element 34 of the T network so as to re-establish the predetermined current ratio. A zero-centered voltmeter 51 is connected across the plates of the relay control tubes 48 in the same manner as meter 25 in Figure 1. This meter 51 indicates the amount and direction of relative changes of amplitude of antenna current.

Figure 4 shows an alternative method and means for obtaining the voltages which are applied to the commutators, for both phase and amplitude control. The antenna 2, for example, is shown connected to an R. F. feeder which includes the elements 32, 33, and 34, of the T network. The primary winding of a transformer 60 is placed in series with the R. F. feeder connected to the T network and a condenser potentiometer 61, 62 is connected across the input of the T network. The transformer 60 impresses voltages on the inputs of the phase and amplitude comparing commutators through circuit W and the condenser potentiometer impresses voltages on the commutator inputs through circuit V. It will be understood, of course, that a similar transformer and potentiometer would be used in R. F. feeders to each of the other antennas, except possibly reference antenna 1. It is evident that a change in the phase or amplitude of the antenna current would cause a corresponding change in the phase or magnitude of the voltage in circuit W with respect to the voltage in circuit V. These voltages may, then, be utilized in the same manner as they are in Figure 1 to operate reversible motors 31 and 55 to control the resistive and reactive components of the impedance network, which is shown as a simple T network, but in practice may include elements other than or additional to elements 32, 33, and 34.

The application of the control system described above is not limited to networks containing one element whose adjustment, over a limited range, affects only the resistive component and another element whose adjustment affects only the reactive component. If a re-adjustment of element 32, for example, should also cause the resistive component of the network to change, the system would automatically operate to vary element 34 to compensate for this incidental change of the resistive component. The system will come to rest only when the initial impedance of the network has been reestablished.

This interlocking of the control of elements 32 and 34 may be substantially eliminated, however, by the following scheme, a diagram of which is shown in Figure 5. Let us suppose two voltages, A and B, are again, as in Figures 1 and 3, to be retained in the same phase and amplitude relationship. A voltage B is derived from a line connected to a R. F. source through two variable impedances Z1 and Z2. These impedances may be the elements 32 and 34 of Figures 1 and 3 or other impedances. Likewise, a voltage A is derived from a line connected to the R. F. source through any impedance Z.

When Z1 is varied slightly voltage B is altered relatively to voltage A by a vector P, Figure 6, the vector P being measured by a combination of the change in the amplitude and phase of vector B relative to vector A. Similarly, a small change in the variable impedance Z2 produces a change in the relation between vector B and vector A which is equal to a vector Q.

A voltage proportional to voltage A and a voltage proportional to voltage B are picked out and are combined in a circuit 61 with amplitudes such as to produce a resultant P1 substantially in quadrature with vector Q and equal in amplitude to voltage A. The amplitude of this voltage P1 is then balanced against the amplitude of voltage A across resistor 63. An unbalanced voltage across resistor 63 operates a motor 67 controlling impedance Z1, tending to bring back the balanced condition. Under those conditions a small change in impedance Z2 will have little effect on the voltage P1 that controls the motor 67 operating the impedance Z1. The motor 67 and 68 are controlled by circuits 65 and 66 which are the same as those of Figures 1 and 3.

By following a similar procedure we adjust the circuit controlling motor 68 which operates the variable impedance Z2 so that a small change in Z1 will have little effect on the voltage that controls the motor 68 operating the variable impedance Z2. Under those conditions the impedances Z1 and Z2 will be substantially independent variables.

The procedure for designing the controlling circuits is: First determine the phase of the vector P by making a small change in Z1, and the phase of the vector Q by making a small change in Z2. Second, calculate the phase shift necessary in voltage B relative to voltage A in order to obtain a resultant P1 of the combination of A and B which is in quadrature to Q (in order to operate the motor controlling Z1) and Q1 in quadrature to P (in order to operate the motor controlling Z2).

According to the procedure outlined, the phase relationship between the vectors P and Q may theoretically be any value except exactly in phase or out of phase. Preferably, however, their phase relationship is in quadrature. Although, for the sake of definiteness, the A. C. source 8 has been indicated as being 60 C. P. S., other frequencies may be used.

Another method of combining a voltage B developed in a circuit with a reference voltage A to control an impedance Z1 of that circuit independently of an impedance Z2 of the circuit will now be described with reference to Figures 5 and 7. The circuit may be the T network shown in Figures 1 and 3 and impedances Z1 and Z2 may be the elements 32 and 34 of such a network. Suppose (see Figure 7) a small change is made in Z2 and it is found that the output voltage of the circuit, represented by vector B, undergoes a change represented by the vector Q. Then the phase of voltage B is shifted so that Q is in phase quadrature with A. We then tap off voltages A1 and A2 from the circuit containing voltage A and combine these voltages with B to obtain the resultant voltages V1 and V2. These voltages are then applied to circuits 65 and 66 in the manner shown in Figure 5. Since these voltages V1 and V2 do not change their relative amplitudes with a small change of Z2, the output of the circuit of Figure 5 can be used to control Z1 in response only to variations of Z1. By a similar procedure we may make the control of Z2 substantially independent variations of Z1.

An important feature of this invention is that the operation of the control circuits is independent of the gain of all tubes following the commutator, and since the commutator either has no tubes or is a cathode follower circuit it is practically unaffected by the tube variations. Thus, a high degree of reliability is attained. It has been found that the reliability of the system is enhanced when the plate voltages of tubes V1 and V2 are reduced to 25 or 30 volts.

While the several figures of the drawings show specific embodiments and adaptations of this invention, it is to be understood that the principles and circuits disclosed herein may be applied to systems different from those illustrated without departing from the spirit and scope of the invention as defined in the claims.

We claim:

1. In combination, a pair of electron tubes each having an anode, cathode and control grid, means for impressing potentials of a first frequency counterphasally on the control grids, means for impressing potentials of the same freqency and normally in phase quadrature with said first potentials cophasally on said control grids, a load impedance connected between the cathodes and ground, a low impedance connection for said first frequency from each anode to ground, means for impressing a voltage of a second frequency counterphasally between the anodes and ground, the control grids being connected to the cathodes through the load impedance, means for balancing out the second frequency voltage across the load impedance when the first frequency potentials are in phase quadrature, whereby the second frequency voltage across the load impedance has a given phase when the phase difference between the first frequency potentials is less than 90 degrees and an opposite phase when the phase difference is more than 90 degrees.

2. In combination, a pair of electron tubes each having an anode, cathode and control grid, means for impressing normally equal potentials of a first frequency on the control grids, a load impedance connected between the cathodes and ground, a low impedance connection for said first frequency from each anode to ground, means for impressing a voltage of a second frequency counterphasally between the anodes and ground, the control grids being connected to the cathodes through the load impedance, means for balancing out the second frequency voltage across the load impedance when the first frequency potentials are of same magnitude, whereby the second frequency voltage across the load impedance has a given phase when the potentials on one of the control grids has a greater magnitude than the potentials on the other control grid and an opposite phase when the potentials on the one grid have a lesser magnitude than the potentials on the other grid.

3. The combination set forth in claim 1 including means responsive to the phase of the second frequency voltage across the load impedance for reducing relative phase shifts of said first frequency potentials, and the voltage between the anodes and ground being of the order of 25 volts.

4. The combination set forth in claim 2 including means responsive to the phase of the second frequency voltage across the load impedance for reducing relative shifts in magnitude of said first frequency potentials.

5. The combination set forth in claim 1 including means for measuring the relative phases of said first frequency potentials.

6. The combination set forth in claim 2 including means for measuring the relative magnitudes of the normally equal potentials.

7. A system for controlling the entire contour of a radiation pattern, comprising, a radio transmitter, a plurality of wave energy radiators coupled thereto, and means for maintaining a predetermined relationship of both amplitude and phase of current flow to said plurality of radiators to maintain a predetermined entire contour of radiation pattern generated by said plurality of radiators, separate means coupled intermediate said transmitter and at least certain of said radiators and responsive to deviation from said predetermined relationship of relative amplitudes and phases of individual current flow in said at least certain of said radiators with respect to current in one of said radiators for re-establishing said predetermined relationship.

8. In a system for controlling the relative amplitudes and phases of currents in a pair of radiators, a transmitter coupled to said radiators, a phase and amplitude control system in circuit between said transmitter and one of said radiators, said system comprising first means for varying substantially only amplitude of current flow to said radiators and second means for varying substantially only phase of said current flow to said one of said radiators, means for measuring relative amplitudes of current flow to said pair of radiators, means responsive to said last mentioned means for actuating said first means to re-establish a predetermined amplitude relation between current flow in said pair of radiators upon deviation from said predetermined amplitude relation, means for measuring relative phase of current flow in said pair of radiators, means responsive to said last mentioned means for actuating said second means to establish a predetermined phase relation between currents in said pair of radiators upon deviation from said predetermined phase relation.

9. In a system for controlling the relative amplitudes and phase of currents in at least three radiators, wherein amplitude and phase of current in a first of said radiators is established as standard, first means for measuring the ratios between the amplitudes of current in said first of said radiators and in the remainder of said radiators taken individually, second means for measuring the differences in the phases of the currents in said first of said radiators and in the remainder of said radiators taken individually, means responsive to said first means for controlling primarily the amplitudes of currents in the remainder of said radiators to maintain said relative amplitudes constant, and means responsive to said second means for maintaining primarily said relative phases constant.

10. In a system for controlling the relative phases and amplitudes of two currents, first means for varying substantially only the phase of one of said currents, second means for varying substantially only the amplitude of said one of said currents, third means for generating a first control signal having a sense determined by sense of deviation of said relative amplitudes from a predetermined ratio, fourth means for generating a further control signal having a sense determined by sense of deviation of said relative phases from a predetermined relation, means responsive to said first control signal for controlling said second means to reduce said deviation of said relative amplitudes from said predetermined ratio, means responsive to said further control signal for controlling said first means to reduce said deviation of said relative phases from said predetermined relation.

11. An antenna array comprising, a plurality of radiators, a transmitter coupled via a separate channel to each of said radiators, a separate circuit means for measuring the phase of the current in each of said radiators with respect to a predetermined phase, and means responsive to deviation of the phase of the current in each one of said radiators from a value predetermined for that radiator for re-establishing said value to minimize changes in the antenna radiation pattern provided by said array.

12. In combination, a pair of spatially separated radiators, a source of high frequency current for said radiators, means for deriving a signal proportional in amplitude to the amplitude of current in one of said radiators, means for deriving a signal proportional in amplitude to the amplitude of current in the other of said radiators, means responsive to deviation of the ratio of amplitudes of said signals from a predetermined ratio for generating a control signal representative of said deviation, means for controlling amplitude of current flow in said one of said radiators, and means responsive to said control signals for actuating said means for controlling amplitude of current flow in said one of said radiators to re-establish said ratio.

13. In combination, a pair of spatially separated radiators, a source of high frequency current for said radiators, means for deriving a first control signal in response to deviation of relative phase of currents in said pair of radiators from a predetermined value, means for deriving a second signal proportional in amplitude to the amplitude of current in one of said radiators, means for deriving a further signal proportional in amplitude to the amplitude of current in the other of said radiators, means responsive to the deviation of the ratio of amplitudes of said second and further signals from a predetermined ratio for generating another control signal representative of said deviation of the ratio of amplitudes, means for controlling the relative phase of said currents in said pair of radiators and for controlling amplitude of current in said one of said radiators only, and means responsive to said first control signal and said another control signal for actuating said means for controlling amplitude of current flow in said one of said radiators and relative phase of said currents in said pair of radiators to re-establish said predetermined relative phase and said ratio of amplitudes.

14. An antenna array comprising three radiators, a transmitter coupled via a separate channel to each of said three radiators, means comprising said transmitter for establishing in each of two of said three radiators currents having a predetermined phase relation to the current in the remaining radiator, said last means comprising means responsive to deviations of relative phase of currents in each of said two of said three radiators from said predetermined phase relation to re-establish said predetermined phase relation for each of said two of said three radiators.

15. An antenna array comprising three radiators, a transmitter coupled via a separate channel to each of said three radiators, means for deriving signals proportional in amplitude to the amplitude of current in each of said three radiators, means responsive to deviations of the ratios of amplitudes of each of two of said signals taken with the remaining one of said signals from a predetermined ratio for each of said two of said signals for generating control signals representative of said deviations, means for controlling amplitude of said current in selected ones of said three radiators, and means responsive to said control signals for actuating said means for controlling amplitude of current in said selected one of said three radiators to re-establish said ratio for each of said two of said control signals.

16. An antenna array comprising three radiators, means comprising a transmitter coupled via a separate channel to each of said three radiators, means comprising said transmitter for establishing in two of said three radiators currents having a predetermined phase relation to the current in the remaining radiator, means for deriving first control signals in response to deviation of the phase of said currents in said two of said three radiators from said predetermined phase relation, means for deriving signals proportional in amplitude to the amplitudes of currents in each of said three radiators, means responsive to deviations of the ratio of amplitudes of each of two of said signals, taken with the remaining one of said signals, from a ratio predetermined for each of said two of said signals, for generating second control signals representative of said deviations, means responsive to said first control signals and to said second control signals for restoring said predetermined phase relations and amplitude ratios.

RAYMOND M. WILMOTTE.
CLEMENS X. CASTLE.

REFERENCES CITED

The following references are of record in the file of this patent:

UNITED STATES PATENTS

| Number | Name | Date |
|---|---|---|
| 1,643,323 | Stone | Sept. 27, 1927 |
| 2,042,831 | Crosby | June 2, 1936 |
| 2,080,081 | Lothe et al. | May 11, 1937 |
| 2,173,858 | Pierce et al. | Sept. 26, 1939 |
| 2,175,017 | Cockrell | Oct. 3, 1939 |
| 2,190,037 | Neufeld | Feb. 13, 1940 |
| 2,286,839 | Schelkunoff | June 16, 1942 |
| 2,398,335 | Theis et al. | Apr. 9, 1946 |
| 2,449,174 | O'Brien | Sept. 14, 1948 |

FOREIGN PATENTS

| Number | Country | Date |
|---|---|---|
| 735,055 | France | Aug. 13, 1932 |
| 458,734 | Great Britain | Dec. 24, 1936 |
| 503,471 | Great Britain | Apr. 6, 1939 |